United States Patent
Wilkens et al.

[11] Patent Number: 5,752,437
[45] Date of Patent: May 19, 1998

[54] ROLL BALER

[75] Inventors: Dieter Wilkens, Wolfenbüttel-Ahlum; Jürgen Röhrbein, Vechelde; Joost Honhold, Wolfenbüttel, all of Germany

[73] Assignee: Welger GmbH, Wolfenbuttel, Germany

[21] Appl. No.: 794,359

[22] Filed: Feb. 4, 1997

[30] Foreign Application Priority Data

Feb. 6, 1996 [DE] Germany .................. 196 04 119.8

[51] Int. Cl.⁶ ........................................... A01F 15/07
[52] U.S. Cl. ........................ 100/89; 56/341; 492/36
[58] Field of Search ........................ 100/5, 40, 76, 100/87–89; 56/341; 492/30, 36

[56] References Cited

U.S. PATENT DOCUMENTS

| 98,871 | 1/1870 | Jennings | 100/89 |
| 532,749 | 1/1895 | Banister | 100/89 |
| 579,335 | 3/1897 | Banister | 100/89 |
| 1,834,466 | 12/1931 | Mackenzie | 100/89 |
| 4,163,419 | 8/1979 | Molitorisz | 100/89 |
| 4,198,804 | 4/1980 | Konekamp et al. | 100/89 |
| 4,731,984 | 3/1988 | Van Der Lely | 100/88 |

FOREIGN PATENT DOCUMENTS

| 2656896 | 6/1978 | Germany | 100/89 |
| 64-48766 | 2/1989 | Japan | 492/30 |
| 64-48767 | 2/1989 | Japan | 492/30 |
| 622331 | 4/1949 | United Kingdom | 492/36 |

*Primary Examiner*—Stephen F. Gerrity
*Attorney, Agent, or Firm*—Anderson, Kill & Olick, P.C.

[57] ABSTRACT

A roll baler for agricultural harvest products having a stem and including an approximately cylindrical pressing space and a plurality of press rolls arranged along a circumference of the pressing space close to each other, with each press roll having a plurality of longitudinal ribs uniformly distributed along a periphery of the press roll at a predetermined circumferential distance from each other, and with the predetermined distance being so selected that no two roll ribs lie in two mutually perpendicular longitudinal central planes of the press roll.

7 Claims, 2 Drawing Sheets

ROLL BALER

BACKGROUND OF THE INVENTION

1. Field of the Invention

The present invention relates to a roll baler for agricultural harvest products having a stem, such as hay, straw and silage, which includes an approximately cylindrical pressing space and a plurality of press rolls arranged along the circumference of the pressing space close to each other, with the press rolls being made primarily of steel and having a plurality of longitudinal ribs uniformly distributed along the periphery of a press roll.

2. Description of the Prior Art

A roll baler with above-described press rolls is shown and described in German Utility Model Publication DE8329151 U1. The press roll of the described and shown roll baler has eight longitudinal ribs, with respective pairs of ribs lying in two mutually perpendicular central planes of the press roll. With respect to the gripping properties of the press rolls, this construction of the press roll produces good results in rotating of bales of different harvest stem products. However, the press rolls are susceptible to ruptures, in particular when handling only recently formed silage. In this case, bales having a weight of more than 1000 kg and a diameter of about 1.3 m are handled, and the press rolls are subjected to a very high load resulting, on one hand, from the pressure, which press rolls apply to the bale, and on the other hand, the action of the bale weight on the press rolls. The possibility of increasing the wall thickness of the press rolls is very limited in view of manufacturing consideration. The formation of longitudinal ribs by pleating, which is a conventional way of forming ribs on press rolls, does not permit a substantial increase in the roll wall thickness. For the same reasons, the possibilities of selection of more rigid materials and of changing the rib shape are likewise limited.

German Patent Publication DE-4,025,467A discloses a roll baler with a press roll in which five planar metal bars are non-uniformly arranged on the circumference of a cylindrical tube. The planar bars have a relatively large thickness and rather sharp edges. This roll press insures a strong conveying action but minces the handled stems and, in particular, damages the sheathing cover formed of, e.g., threads or a net. Besides, the production of such press rolls is rather expensive. In addition, these press rolls are not very sturdy, as welds, rivets or screws, with which the bars are connected with the tube, weaken the tube in points in which the bars are connected with the tube.

Accordingly, an object of the present invention is a roll baler of the above-described type in which the press roll have an increased sturdiness and stability even under a very high load.

Another object of the present invention is a roll baler of the above-described type in which the increase of the sturdiness and stability of the press rolls is achieved by simple means.

SUMMARY OF THE INVENTION

These and other objects of the present invention, which will become apparent hereinafter are, achieved by so arranging the longitudinal ribs on a press roll circumference so that there exist no two ribs which lie, respectively, in the two mutually perpendicular central planes of the press roll.

The fundamental idea of the invention is based on a discovery that the tensile stresses are maximal in those ribs which are circumferentially offset with respect to the location of application of a force vector by 90°. The force vector is here applied to a rib which lies in a longitudinal central plane of the press roll which passes through both the center of the pressing space and the center of the press roll. The tests of press rolls, in which the formed ribs are displaced relative to the 90°-zone, have shown that through these press rolls are manufactured in the same way, they have a load carrying capability exceeding that of conventional press rolls by about 20%. During the tests, no fissures at the rib bases were noticed.

In a preferred embodiment of the present invention, at least ten longitudinal ribs are provided on the press roll circumference which are uniformly distributed on the circumference of a press roll. In comparison with the conventional eight-rib roll, in the inventive roll a noticeable reduction of a peak stress is achieved.

BRIEF DESCRIPTION OF THE DRAWINGS

The features and object of the present invention will become more apparent and the invention itself will be best understood from the following detailed description of the preferred embodiment when read with reference to the accompanying drawings, wherein.

DETAILED DESCRIPTION OF THE PREFERRED EMBODIMENT

Figure 1:
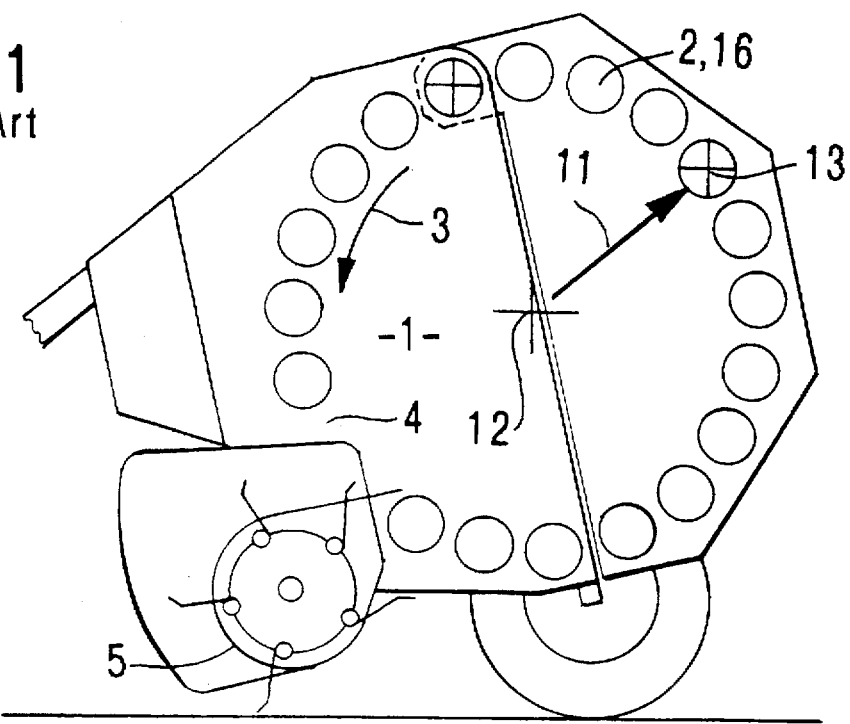
FIG. 1 shows a side view of a prior art roll baler.

FIG. 1 shows a prior art roll baler having a plurality of press rolls 2 provide along a periphery of a pressing space 1. The press rolls 2 are arranged close to each other and are driven in the same circumferential direction 3. At its front side, the baler has a charge opening 4, which is provided between two press rolls, for entering of the harvested goods. A pick-up device 5 picks the goods from the roll baler bottom and feed them into the pressing space.

Figure 2:
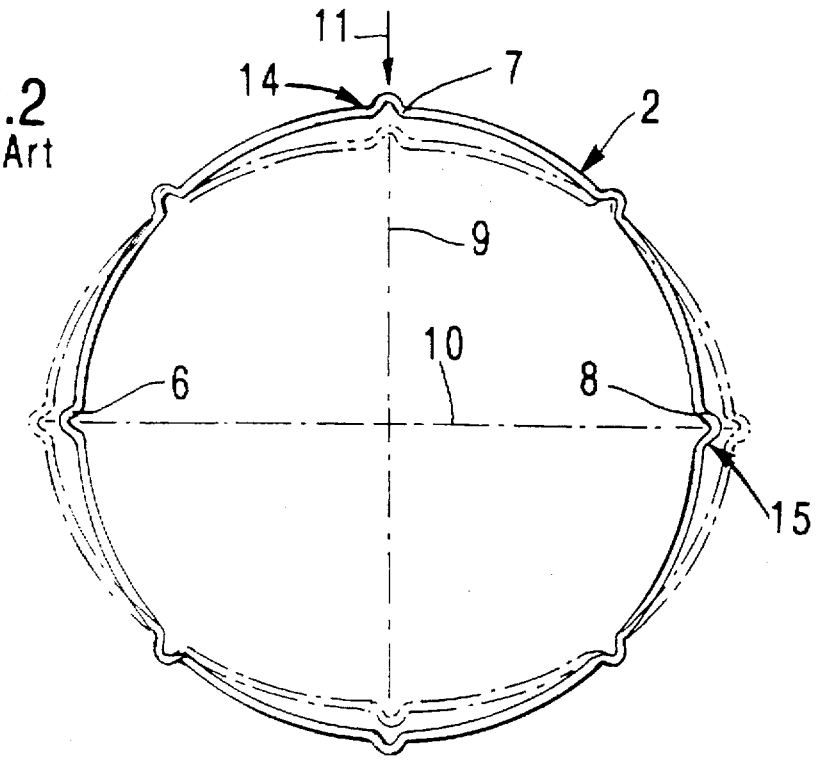
FIG. 2 shows a cross-sectional view of a press roll of the prior art roll baler and having longitudinal ribs in an undeformed condition and in a deformed condition under application of a load.

The press rolls 2 of the prior art baler, one of which is shown in FIG. 2, has eight longitudinal ribs 6 uniformly arranged along the circumference of the roll outer surface so that two respective ribs 7 and 8 lie in two mutually perpendicular, longitudinal center planes 9 and 10 of the press roll 2. For forming the longitudinal ribs 6 on the outer surface of the press roll 2, a device such as described, e.g., in German Utility Model Publication No. 9113338 U1 of the assignee herein can be used.

Figure 3:
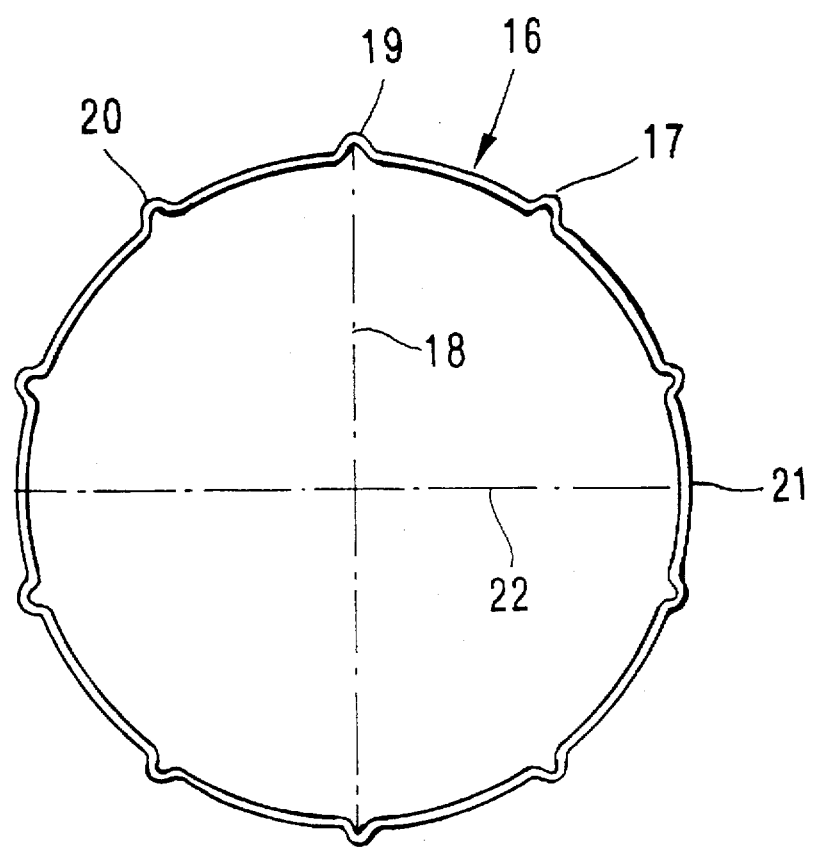
FIG. 3 shows a cross-sectional view of a press roll according to the present invention.

During the pressing process, the goods, which are fed into the pressing space 1, generate a certain pressure. In simplified case, a force vector 11 acts on each pressure roll 2 and runs in a radial direction from the baler center 12 toward the center 13 of the press roll. An unfavorable loading of the press roll 2 takes then place when the longitudinal rib 7 lies on a line which connects the baler center 12 with the center 13 of a respective press roll 2. In this case, the respective press roll 1 is deformed and takes an elliptical shape which is shown with dash-dot lines in FIG. 2. A compressive stress is generated at the base 14 of the rib 7 at a location where the force is applied. At the same time, a tensile stress is generated at the bases of opposite longitudinal ribs 6 and 8, forming fissures in these locations which subsequently lead to rupture, The present invention is directed to preventing the deformation of the press rolls of a roll baler. A press roll 16 according to the present invention is shown in FIG. 3. According to the invention, the press roll 16 is provided with ten ribs 17. In the press roll 16, one of the ribs, rib 19, lies in the central plane 19, and the remaining nine ribs 20 are arranged along the circumference of the press roll 16 at an angle of 36° toward each other, starting from the rib 19. As a result, no rib lies in the point 21 of the press roll 16, which point 21 lies in horizontal central plane 28 which extends at an angle of 90° to the vertical central plane 18 in which one of the rib, rib 19 is located. Providing ten ribs instead of eight and arranging them at an angle of 36° relative to each other, starting from a rib located in a central plane, permitted to substantially increase the operational life of a press roll.

Though the present invention was shown and described with a reference to a preferred embodiment, various modifications thereof would be apparent to those skilled in the art and, therefore, it is not intended that the invention be limited to the disclosed embodiment and/or details thereof, and departure therefrom can be made within the spirit and scope of the appended claims.

What is claimed is:

1. A roll baler for agricultural harvest products having a stem, comprising:

an approximately cylindrical pressing space; and a plurality of press rolls arranged along a circumference of the pressing space close to each other, wherein each press roll has a plurality of longitudinal ribs uniformly distributed along a periphery of the press roll at a predetermined circumferential distance from each other, and wherein the predetermined circumferential distance is so selected that no two roll ribs lie in two mutually perpendicular longitudinal central planes of the press roll.

2. A roll baler as set forth in claim 1, wherein the press rolls are formed of steel.

3. A roll baler as set forth in claim 1, wherein the longitudinal ribs are formed as pleats of a roll shell material.

4. A roll baler as set forth in claim 1, wherein the plurality of ribs consists of ten ribs.

5. A roll baler as set forth in claim 1, wherein an odd number of ribs consisting of at least nine ribs are uniformly distributed along the press roll circumference.

6. A roll baler as set forth in claim 1, wherein the press rolls are formed of a tube.

7. A roll baler as set forth in claim 1, wherein the press rolls is formed of two half-shells.

* * * * *